Sept. 18, 1945.          I. GUTMAN ET AL          2,384,994
SEPTIC TANK STRUCTURES
Filed March 23, 1942          2 Sheets-Sheet 2

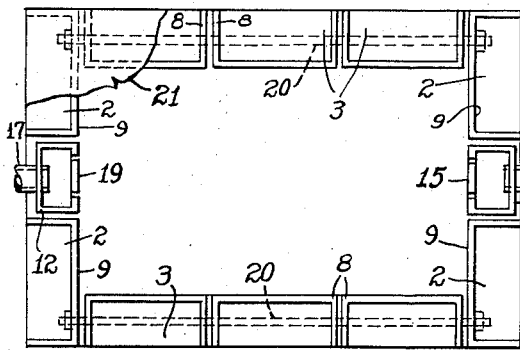
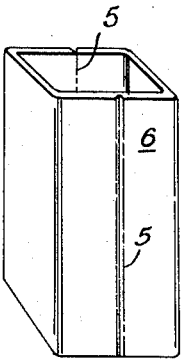
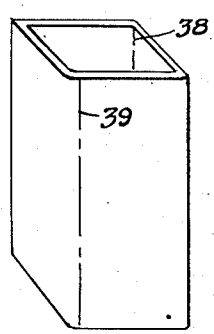
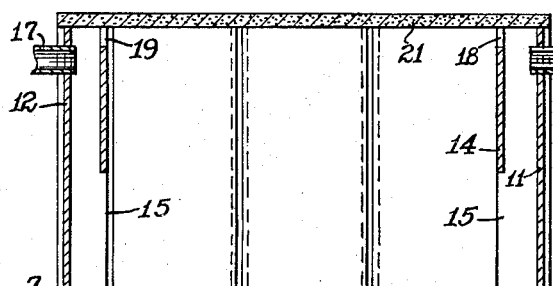
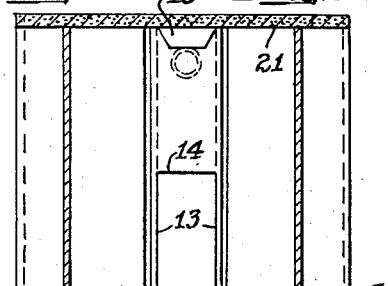
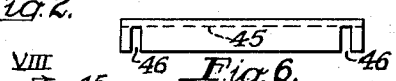
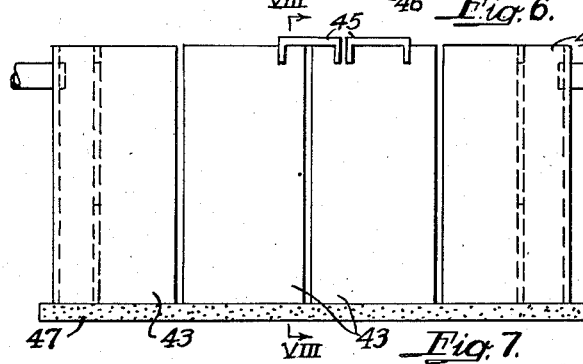
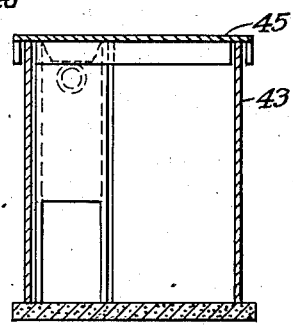
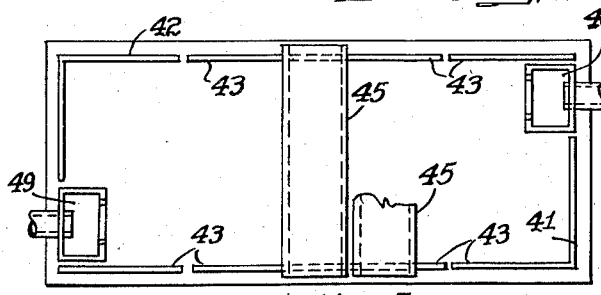
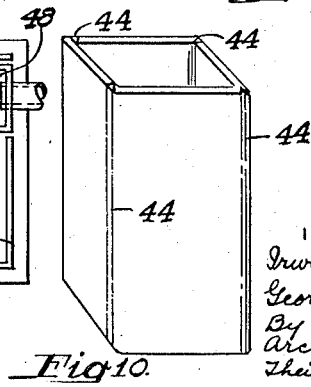

INVENTORS.
IRWIN GUTMAN
BY    GEORGE E. EVANS
Archworth Martin atty.

Patented Sept. 18, 1945

2,384,994

UNITED STATES PATENT OFFICE 2,384,994

SEPTIC TANK STRUCTURE

Irwin Gutman, Lynbrook, N. Y., and George E. Evans, Pittsburgh, Pa.; Elinore E. Ridge executrix of said George E. Evans, deceased Application March 23, 1942, Serial No. 435,918

5 Claims. (Cl. 210—6)

Our invention relates to tank structures, and while it is hereinafter described as employed in connection with septic tanks, it will be understood that tanks constructed in accordance with this invention may be employed also for other purposes.

One object of our invention is to provide a tank structure of such arrangement that it may be made from standard shapes that can readily be assembled in desired numbers to form tanks of various sizes.

Another object of our invention is to provide a method whereby the tank wall elements can be cheaply formed from plastic material, then shipped to the place of installation and there assembled in sufficient number to produce tanks of desired capacity, without the necessity of employing special equipment or skill.

Still another object of our invention is to provide a method whereby tubular clay shapes may be utilized, which shapes can be made cheaply and which can be scored or grooved while still softened, to provide weakened lines along which the shapes may be divided after they have been fired, to form tank wall elements.

While our invention is hereinafter described as having wall elements which may conveniently be formed of clay such as that employed in the making of sewer pipe etc., it will be understood that the tank elements may be made of other materials, including cement and metal.

Figure 11:
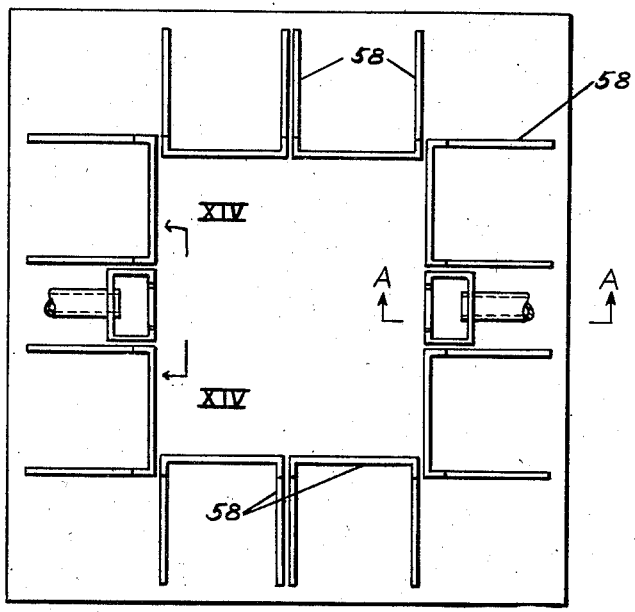
Figure 12:
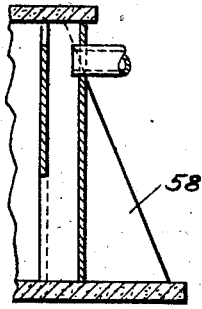
Figure 13:
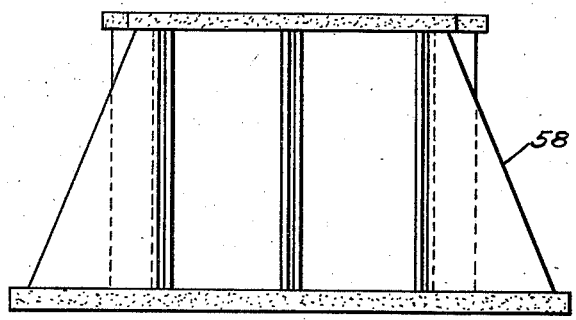
Figure 14:
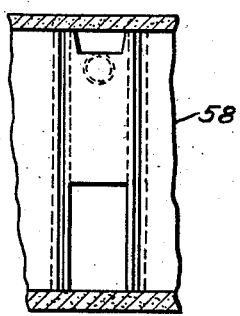
Figure 15:
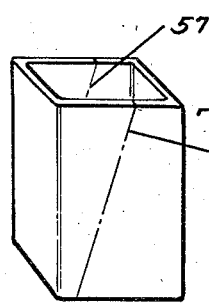

Figure 1 is a plan view of a septic tank structure with a portion of the cover broken away; Fig. 2 is a longitudinal sectional view thereof; Fig. 3 is a cross sectional view; Fig. 4 is a perspective view showing a tubular clay member and the manner in which it is primarily formed previous to the division thereof into halves for forming parts of the tank structure of Fig. 1; Fig. 5 is a plan view of another form of tank structure; Fig. 6 is a side view of a tie element of Fig. 5; Fig. 7 is a side view of the tank of Fig. 5; Fig. 8 is a view taken on the line VIII—VIII of Fig. 7; Fig. 9 is a perspective view of a tubular member, indicating the manner in which it is divided into halves for forming the corner elements of Figs. 5 and 7; Fig. 10 is a view showing how a tubular member can be divided to form the wall slab elements of Figs. 7 and 8; Fig. 11 is a plan view of another form of tank structure, with the cover removed; Fig. 12 is a view taken on the line A—A of Fig. 11; Fig. 13 is a side view of the tank; Fig. 14 is a view taken on the line XIV—XIV of Fig. 11, and Fig. 15 is a perspective view of a rectangular tubular member and the manner in which it is divided to form wall elements of Figs. 11 to 14.

Referring first to Figs. 1 to 4, the tank structure comprises side and end wall elements 2 and 3 which are of identical form as hereinafter explained. These elements may suitably be formed from tubular members that are of approximately rectangular form in cross section, the tubular members being made of clay such as employed in the manufacture of sewer pipe, by the extrusion method, the clay being extruded through dies to produce the tubular shapes that are cut to desired lengths while still plastic or green. These shapes when used for the making of septic tanks may suitably be 24" x 24" horizontal dimensions and 48" in length. The tubular members shown in Fig. 4, while still green, are scored or grooved, either after extrusion or during extrusion, along the lines 5, for a distance of one-fourth to one-half the wall thickness, both inside and outside. They are then burned after the manner customary in the making of sewer pipe, whereupon they will be broken away along the lines 5, each shape thus serving to form two channels that will be utilized as the wall elements 2 and 3.

This matter of burning the shape while it is still in tubular form is important, because if it were completely split before burning, there would frequently be considerable warping of the walls, thus distorting its shape and rendering the elements unsuitable for neat-fitting assembly with one another. During burning there is sufficient thickness of material remaining at the grooves 5 to afford the necessary support against distortion during burning, but the grooves enable substantially clean breaks to be made after firing.

The elements 2 and 3 are placed in upright position upon a suitable foundation, such as a cement base 7, and usually they will be placed while the base 7 is in at least a semi-plastic condition and into which the elements will settle slightly, so as to provide firm support against shifting of the parts on the base. The flanges 8 of adjacent elements may be placed in abutting relation, any slight crevice that would allow leakage of water from the interior of the tank being soon closed by accumulation of sludgy material from the sewage, between adjacent flanges 8. In other instances, cement or sewer joint compound may be placed between these faces, which will prevent even temporary leakage after installation of the tank. The end elements 2 have their web portions 9 engaging with the endmost flanges of the elements 3. Inlet and outlet baffle members 11 and 12 respectively are provided.

As many elements 2 and 3 will be employed in each tank as is necessary to produce tanks of desired capacities. Furthermore, the baffle elements 11 and 12 may be of greater or less width than shown on the drawings, and may suitably be formed of rectangular clay members. These baffle members can conveniently be formed by vertically scoring one wall of a tubular clay element adjacent to opposite corners, at their lower ends, along lines 13, and making a score line transversely at 14, so that an opening 15 will be formed in the inner wall of the baffle member, by breaking out this scored panel portion after firing. The upper portion of the baffles will have circular holes cut in it for the reception of inlet and outlet pipes 16 and 17 respectively. These openings can be cut either while the pipe is green, or scored and then broken out after firing. Similarly, the upper edges of the innermost walls of the baffle elements are cut away as shown at 18 and 19, to prevent entrapment of gas in the upper portion of the chamber, between the baffle elements. Tie bolts 20 may be employed for rigidly holding the elements in assembled relation, as indicated by dotted lines in Fig. 1, but ordinarily, tie elements will not be required, because when made of clay or concrete, the elements may each have a wall thickness of perhaps 1½ inches and thus be very heavy. Furthermore, mortar or sealing compound in the joints will prevent any element tilting out of position. After the parts have been assembled, as above explained, a suitable cover 21 will be placed on the elements.

Referring now to Figs. 5 to 8, we show a tank structure that includes flat plates or slabs as well as angular shapes. As shown in Fig. 9, a tubular clay body is scored and then broken along lines indicated at 38 and 39. The half sections thus formed constitute the corner elements 41 and 42 of the tank. The flat slab elements referred to are designated by the numerals 43. These slabs can be formed by scoring or grooving a tile member adjacent to each of its four corners, as indicated at 44 in Fig. 10, while the tile is green, and then breaking it along such score lines after firing. Each tile will thus form four slabs 43, which are assembled with one other and the corner elements 41—42 as shown in Figs. 5 and 7. The joints at the edges of these elements 41—42—43 will be sealed by cement or a sealing compound.

In order to hold the slabs firmly in place, we provide tie elements 45 which may suitably be made of split clay sections similar to those of Fig. 4, but of somewhat different dimensions. In any case, these channel-like elements 45 have slots 46 formed in their flanges near their ends, so as to form in effect hooks that will fit over the upper edges of the elements 41—42—43. These elements 45 can be employed in sufficient number to overlie the entire top of the tank and thus serve also as a cover. It will be understood that any suitable number of slabs 43 can be employed and that four corner elements 41—42 can be employed instead of two—depending upon the tank capacity desired.

The elements 41—42—43 can be placed on the concrete base 47 when the base is still semi-plastic, to provide anchorage, or suitable tie elements can be provided for their lower ends. Inlet and outlet baffles 48 and 49 may be of the form shown in Figs. 1 to 3, or of any other suitable design.

In Figs. 11 to 14, we show an arrangement which is quite similar to that of Figs. 1 to 3, but wherein the tubular members are scored and broken along diagonal lines 57 to form wall elements 58. These elements are assembled in substantially the same manner as are the elements of Figs. 1 to 3. One advantage of this arrangement is that wall elements made from a given size of tile will have wider bases and lower centers of gravity, and therefore be of greater stability.

It is to be noted that the arrangements of tanks and their elements as variously shown and described herein possess various advantages structurally—whether the elements are formed of clay or tile, or of other materials. Some of these advantages being convenience resulting from the shapes employed and the ease with which they can be shipped to the place of installation and there set up to form tanks of various sizes, and without the use of special tools or forms.

We claim as our invention:

1. A septic tank, comprising a plurality of wall-forming elements compactly grouped around a given area, to form a chamber, means for holding the elements in assembled relation, a vertically-extending baffle member of generally tubular form coextensive in height with said elements, and of rectangular form in cross section, disposed between two of said elements and forming part of the chamber wall, inlet means at the baffle and outlet means at a point remote therefrom, and top and bottom closure members for the chamber, the baffle member having an inlet opening at the upper part of its outer wall and communicating with the chamber area at a lower plane, past its inner wall.

2. A septic tank comprising a base, a cover, a plurality of wall-forming elements compactly grouped on the base and around a given area, to form a chamber, means for holding the elements in assembled relation, and an upright baffle member of generally tubular form constituting one of said elements, the baffle member having an inlet opening through an upper portion of its outer wall and having an opening through a lower portion of its inner wall, and one of the elements being provided with an outlet near its upper end.

3. A septic tank comprising a base, a cover, a plurality of wall-forming elements compactly grouped on the base and around a given area, to form a chamber, means for holding the elements in assembled relation, and an upright baffle member of generally tubular form constituting one of said elements, the baffle member having an inlet opening through an upper portion of its outer wall and having an opening through a lower portion of its inner wall, and also having an opening through its inner wall, at a plane above the first-named opening, and one of the elements being provided with an outlet near its upper end.

4. A septic tank comprising a base, a cover, a plurality of wall-forming elements of generally channel form compactly grouped in upright position on the base and around a given area, to form a chamber, means for holding the elements in assembled relation, and an upright tubular baffle member of rectangular form in cross section, disposed between two of said elements, the baffle member having an inlet opening through an upper portion of its outer wall and having an opening through a lower portion of its inner wall, and one of the elements being provided with an outlet near its upper end.

5. A septic tank comprising a plurality of wall-forming elements compactly grouped around a given area, to form a chamber, means for holding the elements in assembled relation, two vertically-extending baffle members of generally tubular form disposed in relatively spaced relation, between certain of said elements, in position to form parts of the chamber walls, and being coextensive in height with the said elements, the baffle members being provided with inlet and outlet openings, respectively, at their upper portions, and at their lower portions having openings into the chamber.

IRWIN GUTMAN.
GEORGE E. EVANS.